United States Patent
Shukla (10) Patent No.: US 7,625,591 B2
(45) Date of Patent: Dec. 1, 2009

(54) AMORPHOUS INSOLUBLE CELLULOSIC FIBER AND METHOD FOR MAKING SAME

(75) Inventor: Triveni P. Shukla, Vernon, WI (US)

(73) Assignee: Z Trim Holdings, Inc., Mundelein, IL (US)

( * ) Notice: Subject to any disclaimer, the term of this patent is extended or adjusted under 35 U.S.C. 154(b) by 0 days.

(21) Appl. No.: 11/844,878

(22) Filed: Aug. 24, 2007

(65) Prior Publication Data

US 2008/0014325 A1   Jan. 17, 2008

Related U.S. Application Data

(63) Continuation of application No. 11/152,314, filed on Jun. 14, 2005.

(51) Int. Cl.
  *A23L 1/164* (2006.01)
(52) U.S. Cl. .................. 426/620; 426/74; 426/615; 426/639; 426/640; 426/658
(58) Field of Classification Search ............... 426/640, 426/455, 456, 463, 465, 469, 478, 516, 518, 426/74, 620, 615, 639, 658
  See application file for complete search history.

(56) References Cited

U.S. PATENT DOCUMENTS

| | | | |
|---|---|---|---|
| 4,842,877 A * | 6/1989 | Tyson | 426/271 |
| 5,011,701 A | 4/1991 | Baer et al. | |
| 5,106,644 A | 4/1992 | El-Nokaly | |
| 5,192,569 A | 3/1993 | McGinley et al. | |
| 5,415,804 A | 5/1995 | Minami et al. | |
| 5,658,609 A | 8/1997 | Abboud et al. | |
| 5,766,662 A | 6/1998 | Inglett | |
| 6,037,380 A | 3/2000 | Venables et al. | |
| 6,048,564 A | 4/2000 | Young et al. | |
| 6,060,093 A | 5/2000 | Davis et al. | |
| 6,149,962 A | 11/2000 | Loh et al. | |
| 6,392,034 B1 | 5/2002 | Trusovs | |
| 6,440,480 B2 | 8/2002 | Dorp et al. | |
| 6,495,190 B1 | 12/2002 | Yaginuma et al. | |
| 6,627,749 B1 | 9/2003 | Kumar | |
| 6,740,344 B2 | 5/2004 | Murphy et al. | |
| 6,761,912 B2 | 7/2004 | Forusz et al. | |

(Continued)

FOREIGN PATENT DOCUMENTS

WO    WO 97/19603    6/1997

*Primary Examiner*—Helen F Pratt
(74) *Attorney, Agent, or Firm*—Loeb & Loeb LLP (57) ABSTRACT

A method for producing amorphous insoluble cellulosic fiber gel, preferably in the form of a dietary fiber gel, and an aqueous product comprising soluble cellulose for use as an adhesive component from the fiber-containing by-products from a variety of grain manufacturing processes is described. The treatment of the fiber residue in the presence of alkali and mechanical shear produces a slurry containing amorphous insoluble cellulosic fiber. The slurry can be further processed to improve color attributes. The amorphous insoluble cellulosic fiber can be separated from the slurry to produce a dietary fiber gel. Water and solute are separated from a liquid component of the slurry. The solute can be yielded as an aqueous product that contains soluble cellulose and can be used as an adhesive component. The recovered water can be recycled within the method so as to reduce waste disposal.

13 Claims, 3 Drawing Sheets

U.S. PATENT DOCUMENTS

| | | |
|---|---|---|
| 6,814,996 B2 | 11/2004 | Murray et al. |
| 2005/0112742 A1 | 5/2005 | Thompson et al. |
| 2006/0286268 A1 | 12/2006 | Shukla |
| 2008/0014325 A1* | 1/2008 | Shukla ..................... 426/573 |

* cited by examiner

FIG. 1
PROCESS FLOW DIAGRAM FOR CORN BRAN

Fig. 2

COMPOSITION OF VARIOUS PROCESS RESIDUES

| Feedstuff | DM % | CP % | EE % | CF % | ADF % | NDF % | Ash % | Remarks |
|---|---|---|---|---|---|---|---|---|
| Peanut hulls | 92 | 7 | 1.3 | 63 | 65 | 74 | 5 | |
| Coffee grounds | 88 | 13 | 15.0 | 41 | 68 | 77 | 2 | Very High fat needs to be pre-extracted |
| Soybean flake, hull | 91 | 12 | 2.8 | 39 | 47 | 65 | 4 | |
| Oat hulls | 93 | 4 | 1.5 | 32 | 44 | 78 | 7 | |
| Grape pomace stemless | 91 | 12 | 7.5 | 32 | 50 | 53 | 9 | High fat needs to be pre-extracted |
| Tomato pomace dried | 92 | 23 | 10.6 | 26 | 50 | 55 | 6 | High fat needs to be pre-extracted |
| Sunflower hulls | 90 | 5 | 2.2 | 25 | 63 | -- | 3 | |
| Brewers dried grain | 92 | 28 | 7.5 | 15 | 22 | 42 | 4 | High fat needs to be pre-extracted |
| Distillers grain corn | 91 | 30 | 8.2 | 14 | 16 | 41 | 2 | |
| Masa Residue | | | | | | | | |
| Dried Apple Pomace | 89 | 5 | 5.2 | 19 | 35 | 45 | 4 | High fat needs to be pre-extracted |
| Artichoke (Jerusalem) Tops | 27 | 6 | 1.1 | 18 | 30 | 41 | 10 | |
| Peanut skins | 92 | 17 | 22.0 | 13 | 20 | 28 | 3 | Very high fats needs to be extracted |
| Dried Beet Pulp | 91 | 11 | 0.7 | 21 | 21 | 41 | 6 | |
| Peanut meal solvent | 91 | 52 | 1.3 | 11 | -- | 14 | 5 | |
| Wheat bran | 89 | 18 | 4.8 | 11 | 14 | 47 | 7 | |
| Distillers grain corn with solubles | 92 | 29 | 10.0 | 10 | 18 | 44 | 5 | Very high fats needs to be extracted |
| Corn bran | 90 | 10 | 6.3 | 10 | -- | 51 | 3 | Buy special low fat corn bran |

| Feedstuff | DM % | CP % | EE % | CF % | ADF % | NDF % | Ash % | Remarks |
|---|---|---|---|---|---|---|---|---|
| Navy Bean Hulls | 90 | 24 | 1.4 | 5 | 8 | 20 | 5 | |
| Distillers dried solubles | 93 | 30 | 9.5 | 4 | 7 | 23 | 8 | High fat needs to be extracted |
| Milo grain | 89 | 11 | 3.2 | 3 | 6 | 20 | 2 | |
| Sweet Potato Peel | 11 | 2.3 | 0.8 | 3 | | | | High fat on bone dry basis needs to be extracted |
| Dried Citrus Pulp | 92 | 8 | 3.9 | 12 | | | 5.5 | A good source of insoluble fiber on bone dry basis |
| Grape Fruit Peel | 18 | 6.7 | 1.9 | 10.6 | | | 3.9 | |
| Orange Pulp | 16 | 6.8 | 2 | 6.2 | | | 3.7 | A good source of insoluble fiber on bone dry basis |
| Walnut and Other Nuts | | | | | | | | All have insoluble fiber for use as feedstock to the instant process. |

Note 1: Crude Protein, most of soluble fiber (part of ADF and NDF), and all ash can become adhesive product.

NOTE 2: DM-% Solids; CP-Crude Protein; EE- fat/oil or Ether Extract; CF-Crude Fiber (insoluble); ADF-Acid Detergent Fiber; NDF-Neutral Detergent Fiber, Ash- Minerals Source: R.F. Peterson (2004), Feed Composition Guide and further compiled by the patentee

Fig. 2 (continued)

COMPOSITION OF VARIOUS PROCESS RESIDUES

AMORPHOUS INSOLUBLE CELLULOSIC FIBER AND METHOD FOR MAKING SAME

This application is a continuation of U.S. patent application Ser. No. 11,152,314 flied on Jun. 14, 2005, which application is incorporated herein in its entirety.

FIELD OF THE INVENTION

The present invention relates to the processing of dietary fiber, including the processing of fiber-containing by-products from the processing of grain, legumes, seeds and other high-fiber plant components and by-products, to produce dietary fiber gel comprising insoluble amorphous cellulosic fiber and aqueous products comprising soluble cellulosic fiber.

BACKGROUND OF INVENTION

Methods for processing agricultural grains, the term "grain" to include grains, legumes, seeds and other high-fiber plant components and plant by-products throughout and for the purposes of this application, particularly methods that consume and convert soluble dietary fiber and starches, and reject insoluble dietary fiber, are known. Whole kernels of grain include the following components: the hull, the germ, and the endosperm. Dietary fiber, both soluble and insoluble, is distributed across these various components of the grain kernel. For example, about half of the dietary fiber in corn is in the bran and hull portions of the whole corn.

Dietary fiber is typically separated and removed from the grain during grain processing. Dietary fiber is preferentially removed from the grain when fiber-containing components of the grain kernel are separated during the processing of the whole grain kernel. For example, dietary fiber tends to be concentrated in certain grain components such as the bran. Thus, during grain milling a substantial portion of the dietary fiber can be removed by separating out the bran portion of the grain after grinding.

Dietary fiber rejected with the bran, hulls, and so forth can be further processed in multistage manufacturing processes to produce useful products such as dietary fiber gels. Dietary fiber that is not rejected with the bran, hulls, and so forth stays with the non-bran and non-hull portion of the grain. During further processing to the grain, the remaining dietary fiber is typically rejected as a waste and is often used for animal feed.

Other grain processes feed the whole kernel of grain. Although some of the dietary fiber in grain kernel can be consumed or converted to other desirable products, most of the insoluble dietary fiber is rejected early in the grain process with rejected solids. For example, in the production of masa, corn flour used in the production of arepa, tortillas, chips and other related corn-based products, the whole kernels of corn are pre-cooked or steeped. Corn hulls and other solids that contain insoluble fiber are rejected during this initial masa production step of steeping. Similarly, in the processing of grain to produce alcohol for human consumption and gasohol production, starch is enzymatically depleted fro the whole grain kernel. The remaining solid residue, which contains insoluble dietary fiber, is rejected from the process. Generally, the solid residue is filtered off after the enzymatic hydrolysis of starch, and contains protein, lipids, and dietary fiber from all the various grain components such as the hull, the germ, and the endosperm. The depletion of dietary fiber from each of the various grain components can vary depending on the specifics of the grain and its processing.

The fiber-containing residue can be rejected as solids or slurry that contains solids depending on the grain process. In either situation, the solids typically contain soluble and insoluble fiber that potentially can be converted into higher valued products such as dietary fiber gel, adhesives, and so forth. Although the rejected solids from some grain processes can be recovered, typically, the recovered solids are used in relatively low economical value applications such as supplements to animal feeds. Alternatively, the rejected solids may not be suitable for human and animal consumption and must be disposed of in an environmentally safe and typically costly manner, i.e. the grain processor may have to pay to land fill the rejected solids. Although yielding higher valued products from the rejected solids, particularly from the associated insoluble dietary fiber, can improve grain processing economics, the recovery and conversion of rejected solids generally involves multiple complex processing steps and is uneconomical.

Accordingly there is a need for a simple process that can accept grain processing residue and by-products that contain dietary fiber from a variety of grain processes, yet can convert the contained dietary fiber into useful products such as insoluble amorphous cellulose in the form of fiber gel, aqueous products that contain soluble cellulose for use wood components, and so forth.

SUMMARY OF THE INVENTION

A method for processing grain and agricultural by-products (collectively, "feedstock") that contain insoluble dietary fiber includes an alkaline treatment step under physical conditions that produce a slurry containing amorphous insoluble cellulosic fiber. The physical conditions include at least one stage of shear that physically disrupts the cellular structure of the dietary fiber. The time, temperature, and strength of alkaline treatment can be varied depending on feedstock characteristics and desired end-product characteristics. Likewise, total shear input can be varied to accommodate feedstock characteristics and desired end-product characteristics.

DETAILED DESCRIPTION OF THE INVENTION

The following describes a method for processing of vegetable material, grain and agricultural residues and by-products of grain processing that contain insoluble dietary fiber. Preferred feedstocks are vegetable material comprising high percentages of cellulose. The method includes at least one step of alkaline pre-treatment of the feedstock under physical conditions, including shear, that disrupt morphological structures containing insoluble dietary fiber. A bleaching step can be performed to enhance visual qualities of any product of the disclosed process.

Figure 1:
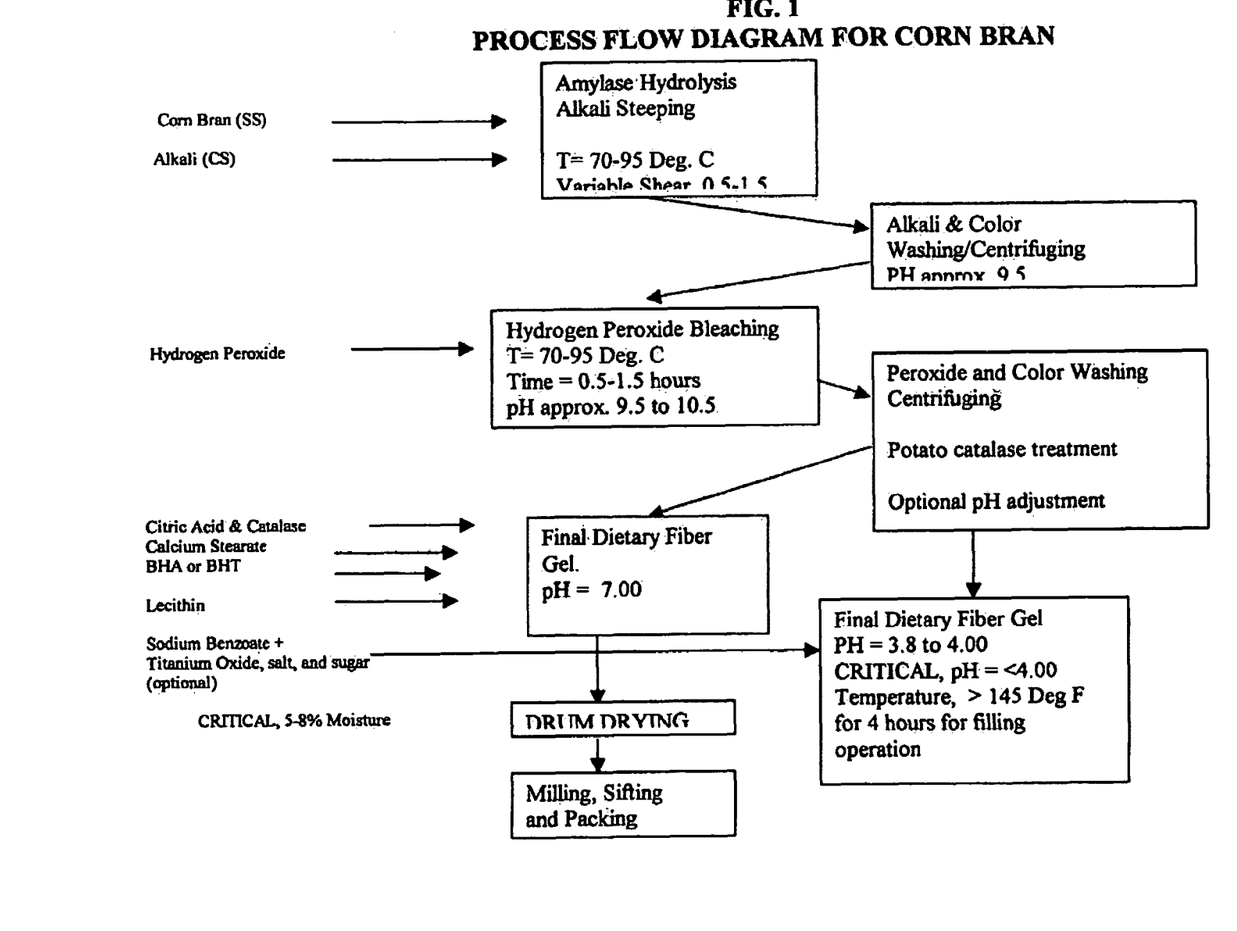
FIG. 1 is a process flow diagram for Corn Bran.

A flowchart depicting a method for processing of grain, agricultural residues and by-products that contain insoluble dietary fiber is shown in FIG. 1. Generally, the feed to the process is fiber-containing agriculturally derived materials; however, other fiber sources such as raw grain and so forth can also be processed by the method. Without specifically limiting the list, the typical sources for agriculturally derived high fiber material are grains such as wheat, barley, oats, sorghum, soy, corn, malt, legumes, seeds and so forth, as well as byproducts and products of the processing of these materials. Examples of these processes include wet and dry milling, distillation, brewing, soy extraction, grain milling, fruit and vegetable processing, and nut processing. High cellulose bearing materials are the preferred feedstock. Although not intended to limit the list of feedstocks, the table in FIG. 2 lists preferred feedstock materials according to their respective crude fiber concentrations.

Generally, agricultural grains are made up of a hull, germ, and endosperm. Depending on the specific grain these components contain various amounts of fiber, both soluble and insoluble. Grain and its components can be processed in myriad ways so as to produce a wide variety of products, by-products, and residues that contain dietary fiber that can be fed to the process. For example, bran and hulls recovered during the milling of whole grain kernels can be fed to the process. The process is not limited to bran and hulls; the whole grain kernel can also be processed. When processing whole grain and the individual components of the whole grain, however, the feedstock is normally finely ground to a nominal diameter of about 0.1 mm to 1.0 mm.

Other agricultural grain derived feedstocks include by-products and residue from a variety of manufacturing processes. For example, the residue rejected during the initial steeping of whole corn in the production of masa can be further processed by the method of this invention. Another example of a feedstock to the method includes starch-depleted grains from alcohol production. Generally, the various manufacturing processes deplete some of the fiber contained in the various components of the grain kernel. Although fiber residue from almost any grain manufacturing process grain can be processed by the method, the desirably of a specific feedstock can depend on the relative amount of fiber remaining in the feedstock. In addition, the residue and by-products from a number of grain manufacturing processes can be a slurry that contains solids. Although the slurry can be feedstock for a process of the invention, it can be a desirable alternative to recover solids from such a slurry and feed the recovered solids to the process.

Structurally, the fiber is fed to the process of this invention is substantially morphologically intact. Although the cellular structure of the feedstock fiber is substantially intact, some manufacturing processes can contribute to a weakening of the cellular structure. Any weakening of cellular structure can contribute to improved process efficiency.

The method includes a pre-treatment step that substantially disrupts the cellular structures of the fiber contained in the feed to the process. The specific conditions required to disrupt morphological structure of the fiber can vary depending on the type of feedstock, including conditions of any prior manufacturing if any, and any feedstock conditioning. Feedstocks comprising difficult to process fiber, i.e. stronger fiber such as oat, flax, pea hull and soy hull, can be processed under high-shear conditions. Feedstocks comprising weaker fiber and feedstocks comprising partially degraded fiber can be processed under lower-shear conditions. Preferably, the feed is contacted with alkali at an elevated temperature and sheared to produce a slurry. Of particular importance in evaluating feedstocks is the ratio of available insoluble cellulosic fiber to interfering substances, for example lignin, tannin, polyphenol and bound organic acids.

Alternatively, the feedstock can be contacted with alkali for a predetermined amount of time prior to shearing. For high fat feedstocks, extrusion and simultaneous Critical Carbon Dioxide Extraction of fat, oil and phytosterols during the pre-treatment step can be advantageous. Following the pre-treatment step, insoluble fiber is separated from the slurry, isolated, and recovered as a gel product. Additionally, aqueous soluble fiber, as well as protein and ash, can be separated from the slurry, isolated, and recovered as a component for adhesive products.

The fiber in the feedstock comes from vegetation and as a result comprises cellulose. Fiber has a complex and varied chemical structure that depends on the nature and the source of the fiber. The disruption of the cellular structures during application of the method involves the chemical and mechanical breakage of chemical bonds upon which cellular structure depends. Thus, the ease or difficulty in disrupting cellular structure depends upon the nature and source of the fiber being processed. For example, the disruption of the cellular structure found in wheat bran can be expected to be different than morphological disruption of corn bran. When grain manufacturing is involved, for example grain steeping, the fiber can be expected to be in a weakened state such that disruption of the cellular structure can be easier than for grain components, such as bran, that have not been steeped and therefore can require application of more extreme shearing force, higher temperatures and higher pH values.

Optionally, feedstocks and particularly feedstocks comprising tough fiber can be fed to the pre-treatment step through a high-shear extruder operating at 250 psi to 1500 psi. It is advantageous to co-extrude the feedstock with alkali. Ideally, processing temperature can be maintained within the range of 100 degrees C. to 230 degrees C. during the extrusion. Extrusion pressure is generated by compression. Carbon dioxide gas can be introduced to the extruder, and can attain a critical liquid state in situ under the high pressure of extrusion. Liquid carbon dioxide is an excellent fat solvent that can act to remove fat from the feedstock during extrusion. The fat can be recovered, and is a desirable by-product because it contains a valuable anti-oxident, namely phytosterol.

At the pre-treatment step, the fiber-containing feedstock is slurried with alkali at concentrations in the range of about 5-25% (pH 9-14) by weight with respect to total solids present in the feedstock, and preferably in the range of about pH 11-12. The preferred alkalis include sodium hydroxide and potassium hydroxide. By adding alkali and any combination of fresh makeup water and recycled process water to the feedstock, a slurry can be produced. The alkali used can be aqueous and solid in form, depending upon the appropriate form necessary for a given application. How the slurry is made depends on the nature and source of the feed. For example, if the feed is fiber-containing bran solids derived from grain milling, then the slurry can be created by combining the bran, after grinding it to the appropriate nominal size, with water and aqueous alkali. Other feeds, such as the residue from steeping of corn in masa production, can already be in a water-wet or partially slurried state such that the feed can be appropriately combined with solid alkali and only minimal amounts of water, either fresh or recycled, as necessary.

Preferably, the feedstock can be combined with alkali and then almost immediately subjected to physical shear to facilitate the disruption of the cellular structure. In general, shearing is best accomplished using a high shear mixer running in the range of 3000 to 5000 revolutions per minute (rpm). Temperatures can be maintained in the range of 12 degrees Celsius (C.) to 98 degrees C., and ideally in the range of 45 degrees C. to 60 degrees C.

Because of the varied chemical nature of the cellular structure for different feeds, an extended contact of the feed with alkali and physical shearing over time can substantially improve the cellular disruption during the application of physical force for more difficult to process feeds. For example, slurry at a pH of 9 and a temperature of 50 degrees C. that contains fiber from the steeping of corn for masa production is readily sheared. On the other hand, a slurry containing fiber in the form of corn bran should be maintained at a pH of 12 and a temperature of 90 deg C. should be subjected to longer periods of shear. Shear time can be reduced by feeding the feedstock to the pre-treatment step through a high-shear extruder, as discussed supra.

The mechanical force of shear that facilitates the physical disruption of the cellular structures can be provided by a variety of means, such as a colloid mill, Waring™ blender, jet cooker, extruder, autoclave with optional agitation, pressure throttling across a valve, and so forth. The specific choice of mechanical means can depend on the nature and source of the fiber being processed. A steam jet cooker provides sufficient shear for the treatment of corn bran; whereas for more recalcitrant substrates, such as oat hulls, the cutting action imparted by a colloid mill or Waring™ blender is preferred. The combination of mechanical shear and alkali should be sufficient to break down the fiber in the slurry into insoluble fiber and soluble fiber components. The pre-treatment step operates at temperatures in the range of about 12 degrees to 98 degrees C., preferably, in the range of about 45 degrees to 60 degrees C. The shear residence time depends on the nature and source of the feedstock, desired products, and other operating conditions, but will typically be on the order of about 1-180 minutes.

The pre-treatment step of the process can be enzymatically enhanced. Feedstocks can vary greatly in their respective compositions. Some feedstock, for example, can comprise greater than 0.5% fat. Such an elevated fat concentration, in the presence of alkali, can generate an unwieldy volume of foam. This can be avoided by adding an appropriate enzyme, for example lipase, to the slurry. As described supra, high-fat feedstocks can be run through an extruder prior to the pre-treatment step to reduce fat content of feedstock entering the pre-treatment step. Similarly, feeds comprising higher protein concentrations can benefit from the addition of a protease or other appropriate enzyme to the slurry, while feeds comprising relatively large amounts of hemicellulose can benefit from the addition of hemicellulase. Addition of alpha amylase can remove high concentrations of starch. Natural sources of these enzymes, and any enzyme that can facilitate the process, can be used in place of and in addition to commercially available high-grade enzymatic reagents. For example, addition of malt barley can provide needed enzymes, including protease and amylase. Addition of ten pounds of cut potatoes to 2000 gallons of slurry can provide ample catalase to remove excess hydrogen peroxide. Similarly, This pre-treatment breaks down the fiber into a slurry comprising both soluble fiber components and insoluble fiber components that can be highly colored. The insoluble component of the slurry contains the amorphous insoluble cellulosic fiber product that is produced by this invention. The soluble component of the slurry contains soluble carbohydrate components such as soluble celluloses, starch, protein, hemi-cellulose, and so forth.

The next step in the process involves the separation of the slurry into its components. Separation can be accomplished by filtration, or preferably centrifugation. Centrifuge overflow contains the soluble fiber component. The soluble component can be removed and used in other applications such as adhesive production. The underflow comprises the hydrated insoluble component and can be processed according to one of two routes. First, the underflow can be looped back to the previous step for further pretreatment and shearing. This can be a desirable redundancy when processing difficult feedstocks. Alternatively, the underflow can continue to the next step of processing. In either case, the underflow can be washed with water in order to remove the majority of color and alkali prior to proceeding.

The wash water can comprise fresh water. Counter-current washing can be advantageous, and uses water recovered from subsequent processing steps of previously processed batches. A combination of fresh water and countercurrent water can be employed.

A primary purpose of the next step of the method, the bleaching step, is the removal of residual color from the recovered amorphous insoluble cellulosic fiber gel product. Further morphological disintegration, however, also occurs during this step. Color removal can be accomplished by treating the slurry with an agent that improves color. Color improvement can be achieved by treating the slurry with an oxidizing agent such as hydrogen peroxide, sodium hypochlorite, perchlorate, and so forth. The purpose of the color improvement agent is to remove any residual color in the recovered amorphous insoluble cellulosic fiber gel product and therefore the agent should be incorporated at a level of at least about 1%, and preferably about 5-25%, by weight of the solids in the suspension. It has been observed that the oxidizing agent can serve to increase the rehydratability of the recovered product.

Figure 2:
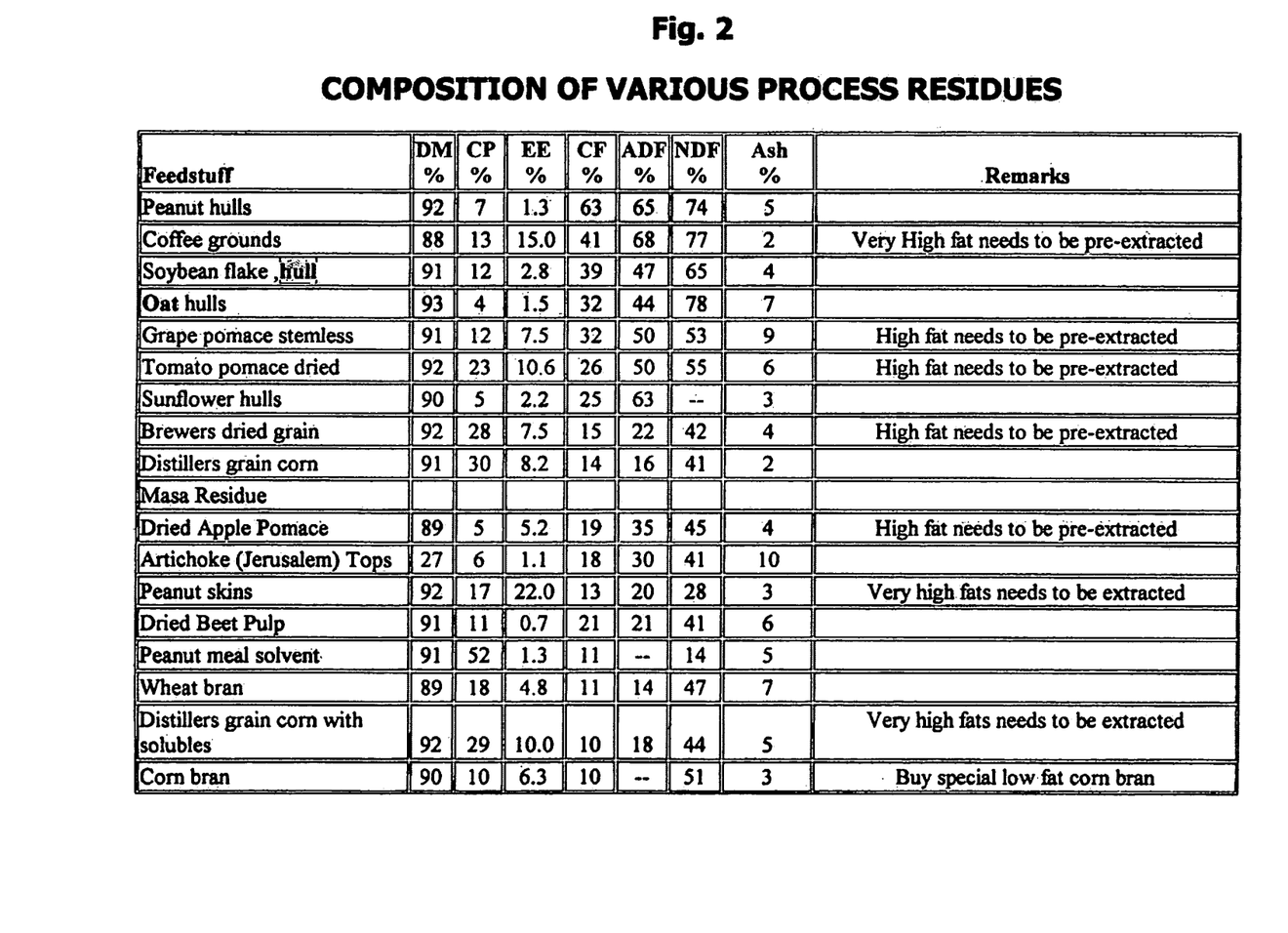
FIG. 2 is a table demonstrating respective compositions of some of the various potential feedstocks.

The oxidizing agent also helps to further morphologically disintegrate the fiber in the slurry. Taking note of FIG. 2, the values in that table can be used to calculate the appropriate amount of oxidizing agent to add during the bleaching step. The formula to use is:

(ADF−CF)+(NDF−ADF)=amount of oxidizing agent to add to the slurry where CF is weight of Crude Fiber (insoluble), NDF is weight of Neutral Detergent Fiber and ADF is weight for Acid Detergent Fiber. For example, if processing 100 kilograms (kg) of peanut hulls:

(65−63 kg)+(74 kg−65 kg)=11 kg of Hydrogen Peroxide.

Optionally, the recovered amorphous insoluble cellulosic fiber gel can be fed to the bleaching step through a high shear extruder operating at 250 psi to 1500 psi. It is advantageous to co-extrude the feedstock with oxidizing agent, for example hydrogen peroxide. Ideally, processing temperature can be maintained within the range of 100 degrees C. to 230 degrees C. during the extrusion. A single long barrel extruder with multiple injection points can be used.

In addition to the color enhancement techniques described above, the bleaching step incorporates further shearing as in the pre-treatment. The pH range for this bleaching step can be 8.5 to 9.8, preferably 9.5. Temperature can range, as in the pre-treatment step, from 12 degrees C. to 98 degrees C. A preferred temperature range, generally, is 45 degrees C. to 60 degrees C. Lower temperatures, however, can be advantageous when the desired finished product is hydrated insoluble amorphous cellulosic fiber gel. In that case, the drying step may not be performed and the gel will proceed directly to packaging.

Optionally, the recovered, color-enhanced amorphous insoluble cellulosic fiber gel can be fed through a high shear extruder operating at 250 psi to 1500 psi. This can be advantageous in the removal of water, and thus can reduce drying time.

After completing of the bleaching step of the process, the slurry is again separated into its soluble fiber component and insoluble fiber component. The separation is optimally carried out by centrifugation or filtration with washing of the insolubles and solids as necessary. For example, separation can include separation based on density differences, vacuum filtration, filter press, horizontal plate, centrifugation, and so forth. As in the previous separation step, the underflow is retained and can proceed either to loop back to a previous step for further processing, for example repeating the bleach step, or proceed to be washed. The objective of this separation step is to rid the solids of as many of the color bodies as possible by resuspension of the insoluble component in water at about 2-15% solids content and repeating the washing until the wash water runs clear, substantially all soluble color bodies are removed, and the pH drops to about 6-9. Prior to the last wash cycle an appropriate enzyme, for example catalase when the oxidizing agent is hydrogen peroxide, can be added to the slurry in order to neutralize any residual oxidizing agent from the water. A natural source of catalase is raw potato.

The components of water and soluble are separated from the liquid recovered during the separation of insoluble material from treatment slurry effluent. The separation is designed so as to produce water of sufficient purity, through use of a combination of ultrafiltration and reverse osmosis, to permit reuse in the process of the method or of sufficient purity for the environmentally safe disposal of the recovered water. Preferably, the separated water is combined with the solid feedstock and reused. Alternatively, purity of the separated water is set such that the water can be disposed of in the sewer and treated by local water treatment facilitates. The separation is optimally carried out by highly effective centrifugation and filtration such as ultrafiltration, microfiltration, ultracentrifugation, and so forth.

The separated soluble component contains soluble carbohydrates that depend on the nature and source of the feedstock, but can include hemicelluloses, polysaccharides, starch, and so forth. The solute can be used in a variety of applications related to food, pharmaceuticals, cosmetics, adhesives, and so forth. Purity requirements of specific applications can require additional processing of the solubles. Generally, when purity requirements are less stringent the solubles can be recovered and directly used. For example, the solubles can be used in wood adhesives applications such as the manufacture of plywood, plywood, clipboard, fiberboard, pressboard, wood panels, and other laminated, pressed, and composite wood products.

Ideally, the last wash will be performed using substantially pure water, such as water processed using reverse osmosis (RO). Used wash water can be used for countercurrent washing as previously disclosed. An advantage of using this countercurrent water for previous wash steps is that this wash water can contain oxidizing agents, for example hydrogen peroxide. The presence of oxidizing agents can facilitate color improvement of subsequent product during previous process steps.

At this point, the recovered solids consist of cellular debris in the form of a hydrated gel that is white or very light in color, has little or no flavor, a smooth, creamy texture, and a pH in the range of approximately 5 to 7. Optionally, the solids can be acidified with acid, preferably a food grade acid such as acetic, citric or phosphoric. However, excess acidification should be avoided so as to prevent a buildup of salts in the recovered amorphous insoluble cellulosic fiber product. Ideally, final pH can be 4 or less to help avoid microbial contamination. Sodium benzoate can be added as an anti-microbial agent. Titanium oxide can be added to enhance color. In some case, particularly where the gel will be used in beverages, salad dressings, and other applications where translucency is advantageous, cellulase can be added to partially hydrolyze and clarify the gel.

The gel can proceed to packaging, or it can be dried and then packaged. Hydrated gel can be in the range of 1 to 6 percent amorphous insoluble cellulosic fiber, but preferably 4 percent. Desired concentrations can be achieved by the addition of previously produced amorphous insoluble cellulosic fiber gel, evaporation of excess water, and addition of water, depending upon starting and desired concentration of fiber gel.

Prior to drying, insoluble additives can be added when advantageous. For example, calcium stearate can be added if it is desirable to fortify the gel with calcium, lecithin can be added where fortification with lecithin is advantageous, and so on. Lecithin can also be useful to help keep the recovered product from adhering to drying apparatus. The gel can be dried by any conventional means, including all conventional and well-known means, such as drum drying, spray drying, warm air tray drying, freeze drying, high pressure extrusion, and the like.

The amorphous insoluble cellulosic fiber gel products of this invention are characterized by several unique and unexpected properties. The drum-dried materials assume a smooth sheet- or film-like morphology. Scanning electron photographs of the dried products of the invention reveal that the fiber particles are completely disrupted and exist as cellular debris. The cellular debris is substantially a non-crystalline and amorphous insoluble cellulose. At magnifications of 500-1000×, there is visual evidence of curling at loose edges. When in hydrated form, the gels have smooth surfaces with fairly large deformable bodies about 25 to 50 microns in each dimension. The smoothness of the original gels is restored after reconstitution of the dried products. The gels are also characterized by a relatively low level of syneresis after repeated freeze-thaw cycles, though, at a 3% concentration the viscosity will decrease about 25 to 50% after each cycle, depending upon the ratio of amorphous insoluble cellulosic fiber to crystalline cellulose. Because the gels comprise substantially dietary fiber and water, their caloric value is nil. Therefore, the smooth textured gels with their high viscosity and hydration capacities make them suitable as ingredients for use in preparing calorie-reduced foods without imparting undesirable cotton-like or dry mouth feel, or a sandy, chalky, or gritty texture. The textural qualities imparted by the gels and gel powders can be tailored by appropriate selection of feedstock and by coprocessing of fibers from different sources.

The dried products are readily dispersible in water and can be rehydrated to give high viscosity gels. For example, at 3% solids the reconstituted gels are characterized by viscosities of up to 12,000 cps or greater and hydration capacities up to at least about 25, that is they absorb at least approximately 24 times their weight in water. Subjecting the dried solids to high shear in the presence of water efficaciously carries out rehydration.

Although the present invention is illustrated by the example of a method for processing agricultural grain fiber, the present invention may be applied to: fiber derived from other agricultural sources such as fruits, vegetables, straw derived from grain, and so forth; fiber derived from forest products such as trees, bushes, shrubs, and so forth; fiber derived from grasses including common grasses, hay, and so forth; and any biologically derived fiber that contains a cellulose matrix from which insoluble fiber can be separated.

The present invention provides a number of advantages, including the ability to process the fiber in agricultural-byproducts from a wide variety of grain manufacture processes. The present invention provides a method for relatively simple processing of fiber, yet converts a high percentage of the fiber into useful products such as fiber gel, and adhesive components. The present invention minimizes the disposal of wastewater by recovering and recycling water from slurry effluent. The present invention yields soluble and insoluble fiber-derived products such that the disposed of any by-products is minimized.

The present invention can be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

EXAMPLES

Example 1

Refined Corn Bran

The process of this example can be used for feedstocks comprising weaker and partially processed fiber, such as refined corn bran. All operations herein are performed under elevated temperatures, 70 degrees Celsius (C.) to 95 degrees C., and under high shear.

STEP 1: Alkali Steeping. Feedstock can be added to water to form a slurry and steeped in alkali conditions using sodium hydroxide. Alkali concentration can be in the range of 1 to 25 percent of the total weight of the slurry. Steeping can take anywhere from 0.5 hours to 1.5 hours.

STEP 2: Washing. The slurry can be washed with water until coloration of the slurry is amber. The pH of the slurry should be approximately 9.5.

STEP 3: Separation. The slurry can be separated, preferably by centrifugation, retaining the fraction comprising substantially insoluble fiber and removing the fraction substantially comprising soluble fiber, protein and ash.

STEP 4: Bleaching/Oxidation. Oxidizing agent, preferably hydrogen peroxide, can be added such that the amount (weight) of oxidizing agent added is equal to the amount (weight) of cellulose present in the slurry. Using the Table in FIG. 2, calculate the amount of hydrogen peroxide to be added according to the formula:

$$(ADF-CF)+(NDF-ADF)=\text{amount of oxidizing agent to add to the slurry}$$

The pH of the slurry should be in the range of 9.5 to 10.5. Bleaching can take anywhere from 0.5 hours to 1.5 hours.

STEP 5: Washing. The slurry can be washed with water until all or nearly all coloration is gone.

STEP 6: Separation. The slurry can be separated, preferably by centrifugation, retaining the fraction comprising substantially insoluble fiber and removing the fraction substantially comprising soluble fiber, protein and ash.

STEP 6: Inactivation of Oxidizing Agent. Appropriate enzyme, preferably catalase can be added in sufficient quantity to neutralize the hydrogen peroxide contained in the slurry.

STEP 7: Drying. The slurry can be dried using any conventional means, for example drum drying, spray drying, warm air tray drying, freeze drying, and the like. Addition of hydrophilic agents used in prior art to facilitate the drying process is not required.

Example 2

Wheat Bran

The process of this example can be used for feedstocks comprising wheat bran. All operations herein are performed under elevated temperatures, 70 degrees Celsius (C.) to 85 degrees C., and under high shear.

STEP 1: Alkali Steeping. Feedstock can be added to water to form a slurry and steeped in alkali conditions using sodium hydroxide. Alkali concentration can be in the range of 1 to 25 percent of the total weight of the slurry. Steeping can take anywhere from 0.5 hours to 1.5 hours.

STEP 2: Washing. The slurry can be washed with water until coloration of the slurry is amber. The pH of the slurry should be approximately 9.5.

STEP 3: Separation. The slurry can be separated, preferably by centrifugation, retaining the fraction comprising substantially insoluble fiber and removing the fraction substantially comprising soluble fiber, protein and ash.

STEP 4: Bleaching/Oxidation. Oxidizing agent, preferably hydrogen peroxide, can be added such that the amount (weight) of oxidizing agent added is equal to the amount (weight) of cellulose present in the slurry. Using the Table in FIG. 2, calculate the amount of hydrogen peroxide to be added according to the formula:

$$(ADF-CF)+(NDF-ADF)=\text{amount of oxidizing agent to add to the slurry}$$

The pH of the slurry should be in the range of 9.5 to 10.5. Bleaching can take anywhere from 0.5 hours to 3.0 hours.

STEP 5: Washing. The slurry can be washed with water until all or nearly all coloration is gone.

STEP 6: Separation. The slurry can be separated, preferably by centrifugation, retaining the fraction comprising substantially insoluble fiber and removing the fraction substantially comprising soluble fiber, protein and ash.

STEP 6: Inactivation of Oxidizing Agent. Appropriate enzyme, preferably catalase can be added in sufficient quantity to neutralize the hydrogen peroxide contained in the slurry.

STEP 7: Drying. The slurry can be dried using any conventional means, for example drum drying, spray drying, warm air tray drying, freeze drying, and the like. Addition of hydrophilic agents used in prior art to facilitate the drying process is not required.

Example 3

Corn Masa Residue

The process of this example can be used for feedstocks comprising corn masa residue. All operations herein are performed under elevated temperatures, 70 degrees Celsius (C.) to 85 degrees C., and under high shear.

STEP 1: Alkali Steeping. Feedstock can be added to water to form a slurry and steeped in alkali conditions using sodium hydroxide. Alkali concentration can be in the range of 1 to 25 percent of the total weight of the slurry. Steeping can take anywhere from 1.0 hour to 3.0 hours.

STEP 2: Washing. The slurry can be washed with water until coloration of the slurry is amber. The pH of the slurry should be approximately 9.5.

STEP 3: Separation. The slurry can be separated, preferably by centrifugation, retaining the fraction comprising substantially insoluble fiber and removing the fraction substantially comprising soluble fiber, protein and ash.

STEP 4: Bleaching/Oxidation. Oxidizing agent, preferably hydrogen peroxide, can be added such that the amount (weight) of oxidizing agent added is equal to the amount (weight) of cellulose present in the slurry. Using the Table in FIG. 2, calculate the amount of hydrogen peroxide to be added according to the formula:

(ADF−CF)+(NDF−ADF)=amount of oxidizing agent to add to the slurry

The pH of the slurry should be in the range of 9.5 to 10.5. Bleaching can take anywhere from 1.0 hour to 3.0 hours.

STEP 5: Washing. The slurry can be washed with water until all or nearly all coloration is gone.

STEP 6: Separation. The slurry can be separated, preferably by centrifugation, retaining the fraction comprising substantially insoluble fiber and removing the fraction substantially comprising soluble fiber, protein and ash.

STEP 6: Inactivation of Oxidizing Agent. Appropriate enzyme, preferably catalase can be added in sufficient quantity to neutralize the hydrogen peroxide contained in the slurry.

STEP 7: Drying. The slurry can be dried using any conventional means, for example drum drying, spray drying, warm air tray drying, freeze drying, and the like. Addition of hydrophilic agents used in prior art to facilitate the drying process is not required.

Example 4

Oat Hull

The process of this example can be used for feedstocks comprising oat hulls. Unless noted otherwise, all operations herein are performed under elevated temperatures, 70 degrees Celsius (C.) to 85 degrees C., and under high shear.

STEP 1: Extrusion. Feedstock can be fed to the process via high-pressure extrusion. Pressure can be in the 800 psi to 1500 psi, but ideally should be in the high end of that range. Temperature for the extrusion can be in the range of 120 degrees C. to 160 degrees C., but ideally should be in the high end of that range.

STEP 2: Alkali Steeping. Feedstock can be added to water to form a slurry and steeped in alkali conditions using sodium hydroxide. Alkali concentration can be in the range of 1 to 25 percent of the total weight of the slurry. Steeping can take anywhere from 1.0 hour to 5.0 hours.

STEP 3: Washing. The slurry can be washed with water until coloration of the slurry is amber. The pH of the slurry should be approximately 9.5.

STEP 4: Separation. The slurry can be separated, preferably by centrifugation, retaining the fraction comprising substantially insoluble fiber and removing the fraction substantially comprising soluble fiber, protein and ash.

STEP 5: Bleaching/Oxidation. Oxidizing agent, preferably hydrogen peroxide, can be added such that the amount (weight) of oxidizing agent added is equal to the amount (weight) of cellulose present in the slurry. Using the Table in FIG. 2, calculate the amount of hydrogen peroxide to be added according to the formula:

(ADF−CF)+(NDF−ADF)=amount of oxidizing agent to add to the slurry

The pH of the slurry should be in the range of 9.5 to 10.5. Bleaching can take anywhere from 2.0 hour to 6.0 hours.

STEP 6: Washing. The slurry can be washed with water until all or nearly all coloration is gone.

STEP 7: Separation. The slurry can be separated, preferably by centrifugation, retaining the fraction comprising substantially insoluble fiber and removing the fraction substantially comprising soluble fiber, protein and ash.

STEP 8: Inactivation of Oxidizing Agent. Appropriate enzyme, preferably catalase can be added in sufficient quantity to neutralize the hydrogen peroxide contained in the slurry.

STEP 9: Drying. The slurry can be dried using any conventional means, for example drum drying, spray drying, warm air tray drying, freeze drying, and the like. Addition of hydrophilic agents used in prior art to facilitate the drying process is not required.

Example 5

Soy Hull

The process of this example can be used for feedstocks comprising soy hulls. Unless noted otherwise, all operations herein are performed under elevated temperatures, 70 degrees Celsius (C.) to 85 degrees C., and under high shear.

STEP 1: Extrusion. Feedstock can be fed to the process via high-pressure extrusion. Pressure can be in the 800 psi to 1500 psi, but ideally should be in the high end of that range. Temperature for the extrusion can be in the range of 120 degrees C. to 160 degrees C., but ideally should be in the high end of that range.

STEP 2: Alkali Steeping. Feedstock can be added to water to form a slurry and steeped in alkali conditions using sodium hydroxide. Alkali concentration can be in the range of 1 to 25 percent of the total weight of the slurry. Steeping can take anywhere from 1.0 hour to 3.0 hours.

STEP 3: Washing. The slurry can be washed with water until coloration of the slurry is amber. The pH of the slurry should be approximately 9.5.

STEP 4: Separation. The slurry can be separated, preferably by centrifugation, retaining the fraction comprising substantially insoluble fiber and removing the fraction substantially comprising soluble fiber, protein and ash.

STEP 5: Bleaching/Oxidation. Oxidizing agent, preferably hydrogen peroxide, can be added such that the amount (weight) of oxidizing agent added is equal to the amount (weight) of cellulose present in the slurry. Using the Table in FIG. 2, calculate the amount of hydrogen peroxide to be added according to the formula:

(ADF−CF)+(NDF−ADF)=amount of oxidizing agent to add to the slurry

The pH of the slurry should be in the range of 9.5 to 10.5. Bleaching can take anywhere from 1.0 hour to 6.0 hours.

STEP 6: Washing. The slurry can be washed with water until all or nearly all coloration is gone.

STEP 7: Separation. The slurry can be separated, preferably by centrifugation, retaining the fraction comprising substantially insoluble fiber and removing the fraction substantially comprising soluble fiber, protein and ash.

STEP 8: Inactivation of Oxidizing Agent. Appropriate enzyme, preferably catalase can be added in sufficient quantity to neutralize the hydrogen peroxide contained in the slurry.

STEP 9: Drying. The slurry can be dried using any conventional means, for example drum drying, spray drying, warm air tray drying, freeze drying, and the like. Addition of hydrophilic agents used in prior art to facilitate the drying process is not required.

Example 6

Pea Hull

The process of this example can be used for feedstocks comprising pea hulls. Unless noted otherwise, all operations herein are performed under elevated temperatures, 70 degrees Celsius (C.) to 85 degrees C., and under high shear.

STEP 1: Extrusion. Feedstock can be fed to the process via high-pressure extrusion. Pressure can be in the 800 psi to 1500 psi, but ideally should be in the high end of that range. Temperature for the extrusion can be in the range of 120 degrees C. to 160 degrees C., but ideally should be in the high end of that range.

STEP 2: Alkali Steeping. Feedstock can be added to water to form a slurry and steeped in alkali conditions using sodium hydroxide. Alkali concentration can be in the range of 1 to 25 percent of the total weight of the slurry. Steeping can take anywhere from 2.0 hour to 3.0 hours.

STEP 3: Washing. The slurry can be washed with water until coloration of the slurry is amber. The pH of the slurry should be approximately 9.5.

STEP 4: Separation. The slurry can be separated, preferably by centrifugation, retaining the fraction comprising substantially insoluble fiber and removing the fraction substantially comprising soluble fiber, protein and ash.

STEP 5: Bleaching/Oxidation. Oxidizing agent, preferably hydrogen peroxide, can be added such that the amount (weight) of oxidizing agent added is equal to the amount (weight) of cellulose present in the slurry. Using the Table in FIG. 2, calculate the amount of hydrogen peroxide to be added according to the formula:

$$(ADF-CF)+(NDF-ADF)=\text{amount of oxidizing agent to add to the slurry}$$

The pH of the slurry should be in the range of 9.5 to 10.5. Bleaching can take anywhere from 2.0 hour to 10.0 hours.

STEP 6: Washing. The slurry can be washed with water until all or nearly all coloration is gone.

STEP 7: Separation. The slurry can be separated, preferably by centrifugation, retaining the fraction comprising substantially insoluble fiber and removing the fraction substantially comprising soluble fiber, protein and ash.

STEP 8: Inactivation of Oxidizing Agent. Appropriate enzyme, preferably catalase can be added in sufficient quantity to neutralize the hydrogen peroxide contained in the slurry.

STEP 9: Drying. The slurry can be dried using any conventional means, for example drum drying, spray drying, warm air tray drying, freeze drying, and the like. Addition of hydrophilic agents used in prior art to facilitate the drying process is not required.

Example 7

Nut Hull

The process of this example can be used for feedstocks comprising nut hulls. Unless noted otherwise, all operations herein are performed under elevated temperatures, 70 degrees Celsius (C.) to 85 degrees C., and under high shear.

STEP 1: Extrusion. Feedstock can be fed to the process via high-pressure extrusion. Pressure can be in the 800 psi to 1500 psi, but ideally should be in the high end of that range. Temperature for the extrusion can be in the range of 120 degrees C. to 160 degrees C., but ideally should be in the high end of that range.

STEP 2: Alkali Steeping. Feedstock can be added to water to form a slurry and steeped in alkali conditions using sodium hydroxide. Alkali concentration can be in the range of 1 to 25 percent of the total weight of the slurry. Steeping can take anywhere from 1.0 hour to 5.0 hours.

STEP 3: Washing. The slurry can be washed with water until coloration of the slurry is amber. The pH of the slurry should be approximately 9.5.

STEP 4: Separation. The slurry can be separated, preferably by centrifugation, retaining the fraction comprising substantially insoluble fiber and removing the fraction substantially comprising soluble fiber, protein and ash.

STEP 5: Bleaching/Oxidation. Oxidizing agent, preferably hydrogen peroxide, can be added such that the amount (weight) of oxidizing agent added is equal to the amount (weight) of cellulose present in the slurry. Using the Table in FIG. 2, calculate the amount of hydrogen peroxide to be added according to the formula:

$$(ADF-CF)+(NDF-ADF)=\text{amount of oxidizing agent to add to the slurry}$$

The pH of the slurry should be in the range of 9.5 to 10.5. Bleaching can take anywhere from 2.0 hour to 6.0 hours.

STEP 6: Washing. The slurry can be washed with water until all or nearly all coloration is gone.

STEP 7: Separation. The slurry can be separated, preferably by centrifugation, retaining the fraction comprising substantially insoluble fiber and removing the fraction substantially comprising soluble fiber, protein and ash.

STEP 8: Inactivation of Oxidizing Agent. Appropriate enzyme, preferably catalase can be added in sufficient quantity to neutralize the hydrogen peroxide contained in the slurry.

STEP 9: Drying. The slurry can be dried using any conventional means, for example drum drying, spray drying, warm air tray drying, freeze drying, and the like. Addition of hydrophilic agents used in prior art to facilitate the drying process is not required.

What is claimed is:

1. A method comprising the steps of
   a. providing feedstock, water and alkali, the feedstock comprising cellulose and an amount of i) crude fiber, ii) acid detergent fiber, and iii) neutral detergent fiber;
   b. combining the feedstock, water and alkali to form a first slurry, the alkali being present in a concentration ranging from 1 percent to 25 percent by weight of total solids contained in the first slurry, the first slurry comprising insoluble and soluble cellulosic fiber;
   c. subjecting the first slurry for at least 0.25 hours to conditions defined by high shear sufficient to morphologically disrupt the cellulose at elevated temperatures and elevated temperatures of at least 70 degrees C.;
   d. washing the first slurry with water until coloration of the first slurry is amber;
   e. separating the first slurry into a first fraction and a second fraction, the first fraction of the first slurry comprising most of the insoluble fiber from the first slurry, the second fraction of the first slurry comprising most of the soluble fiber, protein and ash from the first slurry;
   f. removing the second fraction of the first slurry arid retaining the first fraction of the first slurry for further processing;

g. calculating a minimum amount of oxidizing agent to be added;
h. providing an oxidizing agent in least an amount substantially equal to a weight calculated as follows: (weight of Acid Detergent Fiber minus weight of Crude Fiber) plus (weight of Neutral Detergent fiber minus weight of Acid Detergent Fiber);
i. combining the oxidizing agent with the first fraction of the first slurry to form a second slurry;
j. subjecting the second slurry for at least 0.25 hours to conditions defined by high shear sufficient to morphologically disrupt the cellulose at elevated temperatures and elevated temperatures of at least 70 degrees C.;
k. washing the second slurry with water until the second slurry is substantially colorless;
l. separating the second slurry into a first fraction and a second fraction, the first fraction of the second slurry comprising most of the insoluble fiber from the second slurry, the second fraction of the second slurry comprising most of the soluble fiber, protein and ash from the second slurry;
m. providing an enzyme capable of inactivating the oxidizing agent contained in the first fraction of the second slurry in an amount sufficient to completely neutralize the amount of oxidizing agent contained in the first fraction of the second slurry; and
n. combining the enzyme with the first fraction of the second slurry to form a hydrolyzed gel of amorphous insoluble cellulosic fiber.

2. The method of claim 1, further comprising the step:
o. drying the hydrolyzed gel of amorphous insoluble cellulosic fiber.

3. The method of claim 1 or claim 2, wherein the oxidizing agent is hydrogen peroxide.

4. The method of claim 1 or claim 2, wherein the alkali is sodium hydroxide.

5. A method comprising the steps of:
a. providing feedstock, water and alkali, the feedstock comprising cellulose and an amount of i) crude fiber, ii) acid detergent fiber, and iii) neutral detergent fiber;
b. combining the feedstock and water to form a first slurry,
c. feeding the first slurry to the method via high pressure extrusion, the pressure being at least 800 psi,
d. introducing the alkali to the first slurry, the alkali being present in a concentration ranging from 1 percent to 25 percent by weight of total solids contained in the first slurry, the first slurry comprising insoluble and soluble cellulosic fiber;
e. subjecting the first slurry for at least 0.25 hours to conditions defined by high shear sufficient to morphologically disrupt the cellulose at elevated temperatures and elevated temperatures of at feast 70 degrees C.;
f. washing the first slurry with water until coloration of the first slurry is amber;
g. separating the first slurry into a first fraction and a second fraction, the first fraction of the first slurry comprising most of the insoluble fiber from the first slurry, the second fraction of the first slurry comprising most of the soluble fiber, protein and ash from the first slurry;
h. removing the second fraction of the first slurry and retaining the first fraction of the first slurry for further processing;
i. calculating a minimum amount of oxidizing agent to be added;
j. providing an oxidizing agent in an amount substantially equal to a weight calculated as follows: (weight of Acid Detergent Fiber minus weight of Crude Fiber) plus (weight of Neutral Detergent Fiber minus weight of Acid Detergent Fiber);
k. combining the oxidizing agent with the first fraction of the first slurry to form a second slurry;
l. subjecting the second slurry for at least 0.25 hours to conditions defined by high shear sufficient to morphologically disrupt the cellulose at elevated temperatures and elevated temperatures of at least 70 degrees C.;
m. washing the second slurry with water until the second slurry is substantially colorless;
n. separating the second slurry into a first fraction and a second fraction, the first fraction of the second slurry comprising most of the insoluble fiber from the second slurry, die second fraction of the second slurry comprising most of the soluble fiber, protein and ash front the second slurry;
o. providing an enzyme capable of inactivating the oxidizing agent contained in the first fraction of the second slurry in an amount sufficient to completely neutralize the amount of oxidizing agent contained in the first fraction of the second slurry; and
p. combining the enzyme with the first fraction of the second slums to form a hydrolyzed gel of amorphous insoluble cellulosic fiber.

6. The method of claim 5 wherein the alkali is introduced to the slurry via co-extrusion.

7. The method of claim 5 or claim 6 wherein the oxidizing agent is hydrogen peroxide.

8. The method of claim 5 or claim 6 wherein the alkali is sodium hydroxide.

9. The method of claim 5 or claim 6 further comprising the step:
q. drying the hydrolyzed gel of amorphous insoluble cellulosic fiber.

10. The method of any one of claims 1, 2, 5 or 6, wherein protease is introduced to the first slurry.

11. The method of any one of claims 1, 2, 5 or 6, wherein amylase is introduced to the first slurry.

12. The method of any one of claims 1, 2, 5 or 6, wherein catalase is introduced to the first slurry.

13. The method of any one of claims 1, 2 5 or 6 wherein excess water from wash steps is recovered and fed back to the method for reuse in wash steps of subsequent batches of feedstock.

* * * * *